(12) United States Patent
Norek

(10) Patent No.: US 6,647,909 B1
(45) Date of Patent: Nov. 18, 2003

(54) WAVELESS HULL

(76) Inventor: Richard S. Norek, 8 Garrison Dr., Eliot, ME (US) 03903

( * ) Notice: Subject to any disclaimer, the term of this patent is extended or adjusted under 35 U.S.C. 154(b) by 0 days.

(21) Appl. No.: 10/262,018

(22) Filed: Oct. 1, 2002

(51) Int. Cl.$^7$ .................................................. B63B 1/00
(52) U.S. Cl. ......................... 114/56.1; 114/312; 440/38
(58) Field of Search ................. 114/312, 61.1, 114/61.31, 61.32, 56.1, 140, 271, 274, 208; 440/38

(56) References Cited

U.S. PATENT DOCUMENTS

| | | |
|---|---|---|
| 2,997,013 A | 8/1961 | Rice |
| 4,767,370 A * | 8/1988 | Campbell .................... 441/74 |
| 5,088,433 A | 2/1992 | Osawa et al. |
| 5,178,085 A | 1/1993 | Hsu |
| 5,333,444 A | 8/1994 | Meng |
| 5,402,743 A | 4/1995 | Holderman |
| 5,438,947 A | 8/1995 | Tam |
| 5,497,722 A | 3/1996 | English |
| 5,503,100 A | 4/1996 | Shaw |
| 5,544,610 A | 8/1996 | Harding |
| 5,592,895 A * | 1/1997 | Schmidt ..................... 114/274 |
| 5,954,009 A | 9/1999 | Esmiol |
| RE36,879 E | 9/2000 | Schoell |
| 6,112,687 A | 9/2000 | Eder |
| 6,167,829 B1 | 1/2001 | Lang |
| 6,250,245 B1 | 6/2001 | Robinson et al. |
| 6,250,246 B1 * | 6/2001 | Hubley ....................... 114/288 |
| 6,314,903 B2 | 11/2001 | Robinson et al. |
| 6,345,584 B1 | 2/2002 | Mascellaro |
| 6,526,903 B2 * | 3/2003 | Robinson et al. ........... 114/288 |

* cited by examiner

Primary Examiner—Stephen Avila
(74) Attorney, Agent, or Firm—Phillip E. Decker

(57) ABSTRACT

A vessel hull that does not create bow, stern, or transverse waves when moving through the water having an exterior surface that has a substantially constant cross-section along the length of the hull, and an interior surface that substantially encloses a flow channel for the length of the hull, the interior surface forming a converging-diverging diffuser. One standing half wave is contained within the hull, and no waves are generated outside the hull. The hull operates most efficiently at higher speeds, and has broad applications, including torpedo, submarine, destroyer, freighter, tanker, and other hull types.

18 Claims, 8 Drawing Sheets

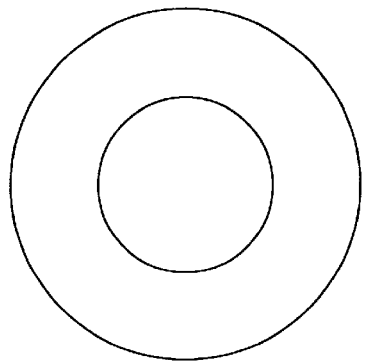
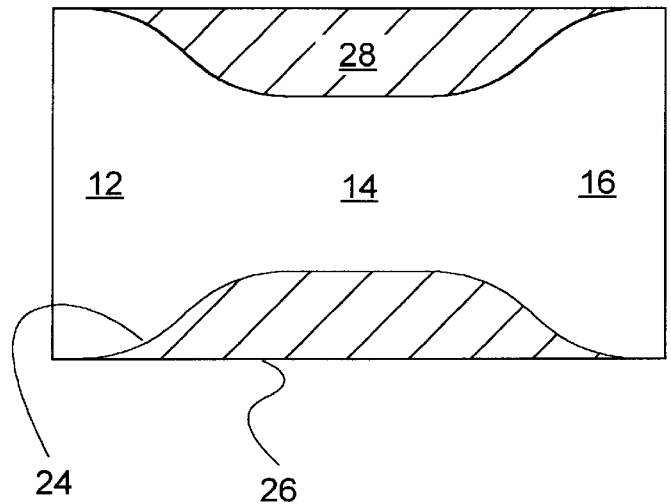
FIG. 5            FIG. 6
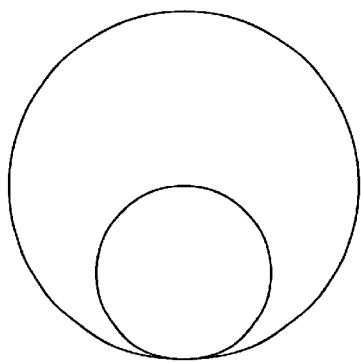
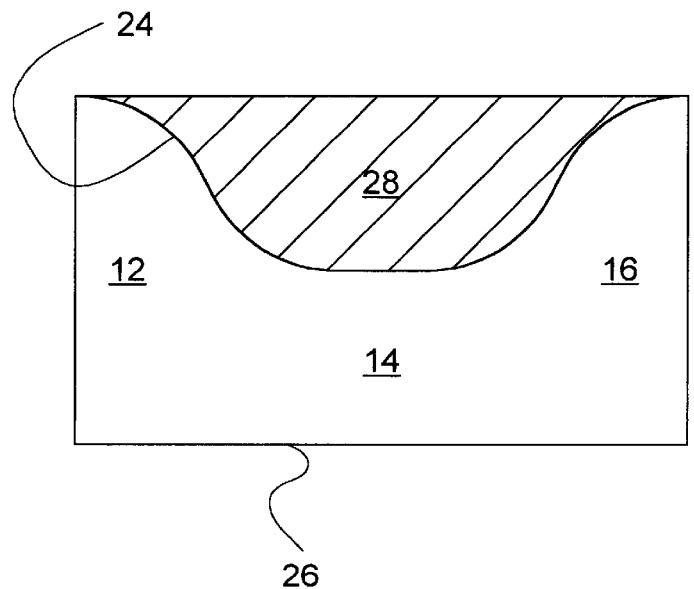
FIG. 7            FIG. 8

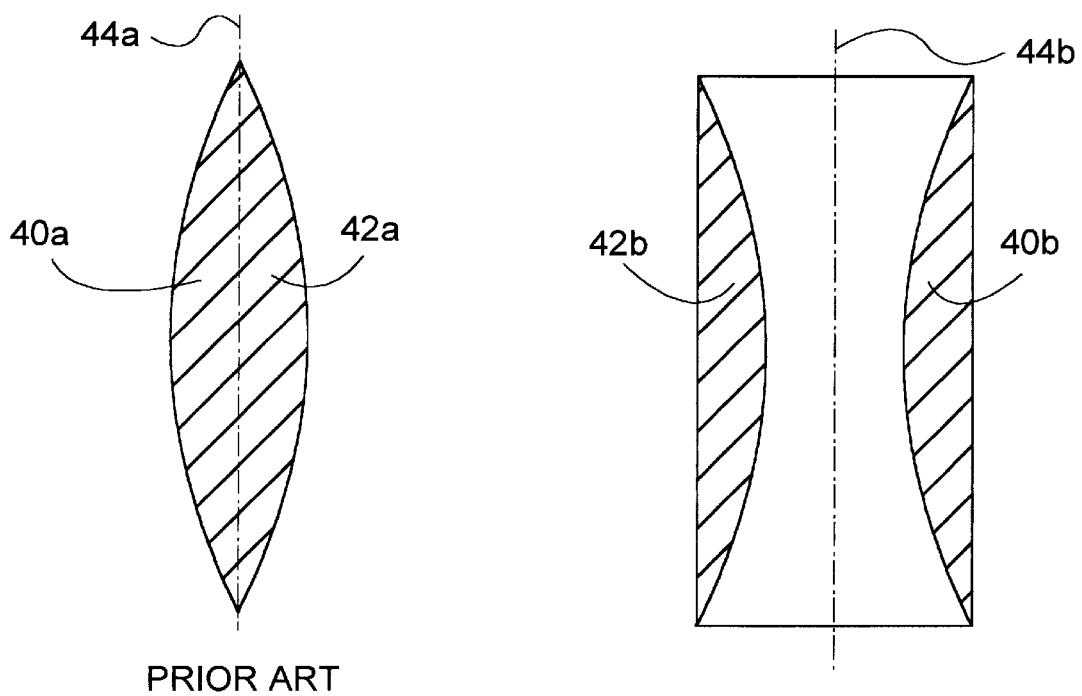
PRIOR ART
FIG. 10
FIG. 11
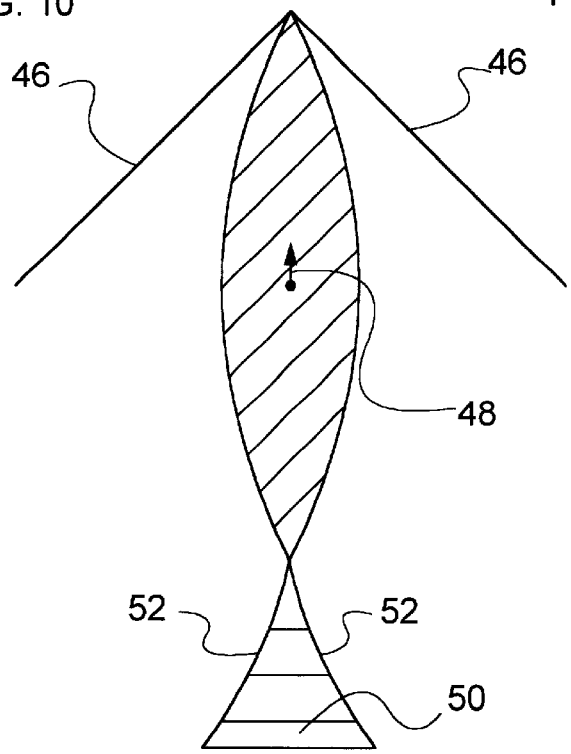
PRIOR ART
FIG. 12

WAVELESS HULL

BACKGROUND

1. Field of the Invention

The invention relates to hull shapes for ships and submarines that substantially eliminate waves caused by movement in or on the water.

2. Description of the Related Art

A traditional hull that is found in the prior art has a pointed end at the bow, and a blunt transom at the stern. When moving forward through the water, the bow generates a bow wave and the stern generates a stern wave and a transverse wave. The vessel also generates pressure waves directed downward. Transverse waves are generated by both sharp and blunt-end sterns.

Generating these waves requires displacing large masses of water, does not assist with the efficiency or the seaworthiness of the vessel, and wastes a great deal of energy. These waves also present a hazard to other vessels, and can be a source of danger or discomfort to their crews and passengers. One example is an accident that occurred in August, 1999, in the Cape Cod Canal. The admiralty court found that the accident was caused by the large waves generated by a passing ship. The accident caused $1.3 million in damage. Large waves also greatly contribute to bank and channel erosion, and weaken bridge and pier supports. It is apparent that a vessel hull that reduces or eliminates bow, stern, and transverse waves would be very beneficial.

Others have attempted to modify the hull design to reduce or eliminate waves. One of them is U.S. Pat. No. 6,112,687 (the '687 patent), which is not admitted to being prior art by its mention in this Background section. In this patent, a "displacement body" is disposed on the underside of the hull and shaped to cancel the waves the hull would otherwise make. This hull does not take pressure waves generated in the downward direction into account at all, and would only be efficient at its rated hull speed.

Another example is disclosed in the U.S. Pat. No. 5,954,009 (the '009 patent), which teaches the application of a "wake reflector system" disposed about a traditional hull shape to contain the bow, stern, and transverse waves. The specification claims that the system is applicable to both surface vessels and submarines. Like the '687 patent, this patent does not take waves generated in the downward direction into account, and it does not attempt to reduce the formation of the waves themselves. The waves are only contained until the vessel has traveled clear of the zone of their immediate effect.

What is needed, therefore, is a vessel hull that does not create bow, stern, or transverse waves when moving through the water.

SUMMARY

An invention that satisfies the need for a vessel hull that does not create bow, stern, or transverse waves when moving through the water has an exterior surface having a substantially constant cross-section along the length of the hull, and an interior surface that substantially encloses a flow channel for the length of the hull, the interior surface comprising a converging-diverging diffuser. These and other features, aspects, and advantages of the present invention will become better understood with regard to the following description, claims, and accompanying drawings.

DRAWINGS

FIG. 5 is a front view of a hull for a submarine.

FIG. 6 is a cutaway side view of the hull shown in FIG. 5.

FIG. 7 is a front view of an alternative asymmetric hull for a submarine.

FIG. 8 is a cutaway side view of the hull shown in FIG. 7.

FIG. 10 is a cutaway plan view a hull of the prior art.

FIG. 11 is a cutaway plan view of a hull according to the present invention.

FIG. 12 illustrates the waves generated by a hull of to the prior art.

DESCRIPTION

A vessel hull according to the present invention has an exterior surface having a substantially constant cross-section along the length of the hull, and an interior surface that substantially encloses a flow channel for the length of the hull, the interior surface comprising a converging-diverging diffuser.

Figure 1:
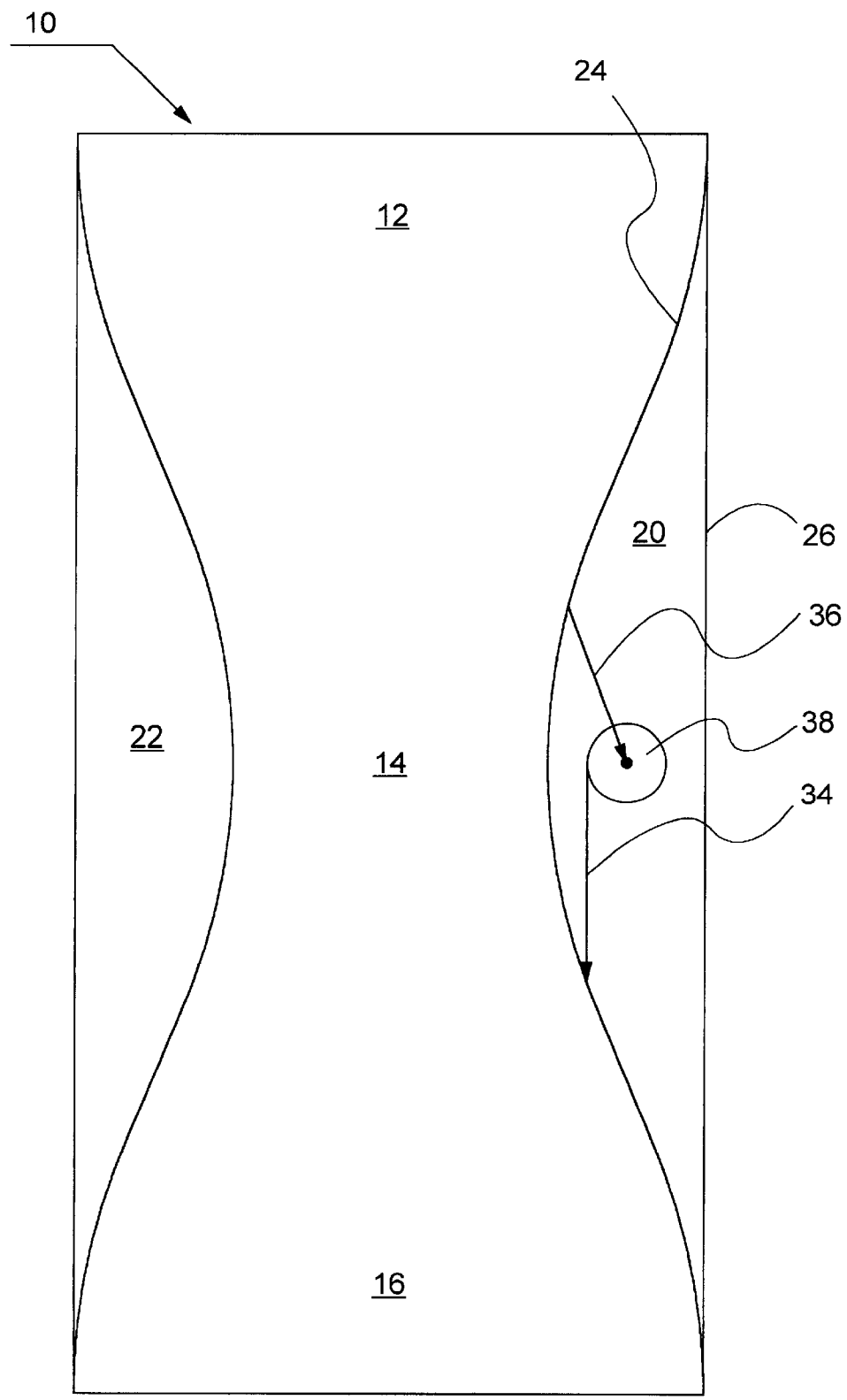
FIG. 1 is a cutaway side view of a hull according to the present invention.

Turning to FIG. 1, the vessel hull 10 can generally be described as having an exterior surface 26 that has a substantially constant cross-section along the length of the hull. This means that the exterior surface 26 does not curve from the bow to the middle to the stern when viewed from above, like conventional hulls. The surfaces making up the exterior surface 26 should be parallel to the direction of the vessel's travel at every section of the vessel. The exterior surface 26 is a cylinder in which all generating lines are parallel to each other.

The exterior surface 26 is preferably a regular polygon, but can be almost any geometric shape. Preferred shapes are rectangles, hexagons, octagons, decagons, circles, and ovals.

The interior surface 24 should enclose most of the water displaced by the vessel, and preferably encloses all of the water. The vessel will not be as efficient if there are gaps and holes admitting water from the exterior surface 26 to the interior surface 24 at any other place besides the bow and the stern, but the scope of this specification is such that they should be considered equivalents to the present invention.

There are several ways to propel the vessel that will substantially maintain its waveless qualities. One example is a water-jet drive option using a pump 38 shown schematically in FIG. 1. Water is drawn through an inlet 36 in the converging portion of the diffuser. The water's energy state is increased using a pump or another means having substantially the same function. Propellers secured in the flow stream, either ducted or unducted, may also be used, but any conventional drive, including sails, may be employed. Another alternative is to pump air from the surface to an outlet 34 behind and the middle throat 14 of the hull. The air bubbles will increase the volume of the mass in the diverging portion of the diffuser, and would push the mass towards the stern throat 16, thus propelling the vessel forward. Two other examples of suitable propulsion means include the electromagnetic thrusters disclosed in U.S. Pat. Nos. 2,997,013, and 5,333,444. Application of these thrusters to the present invention would make a very quiet, and very stealthy vessel.

The cross sectional area of the bow throat 12 and the stern throat 16 should be the same. The cross sectional area of the middle throat 14 should be between about 40% and 70% of that of the bow and stern throats.

One of the major advantages of this type of hull is that it recovers the energy that the hull would otherwise put into displaced water, e.g. waves, while the hull is in forward motion. Conventional hulls move the water aside and the work to do this task is not recovered. The hull of the present invention does not move the water aside, but accelerates it in the converging diffuser in the axial direction along the hull. Subsequently, the energy is recovered, minus hydraulic friction losses, in the diverging part of the diffuser. These losses must be made up by the propulsion of the vessel.

Figure 2:
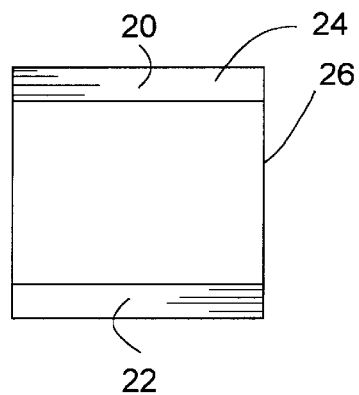
FIG. 2 is a front view of a hull according to the present invention.
Figure 3:
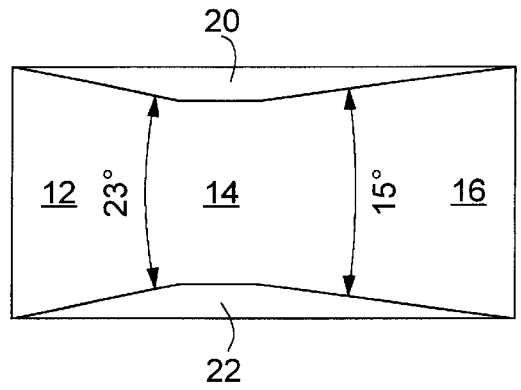
FIG. 3 is a cutaway side view of the hull shown in FIG. 2.

FIGS. 2 and 3 show different views of a hull according to the present invention. Testing has shown that favorable results are obtained when the converging portion of the diffuser is formed at about 23 degrees from side to side of the interior surface 24, and the diverging portion of the diffuser is formed at about 15 degrees from side to side of the interior surface 24, as shown in FIG. 3. (Ref. "Fluid Mechanics Measurements," Goldstein, R. J., Taylor & Francis, 1996.)

Figure 4:
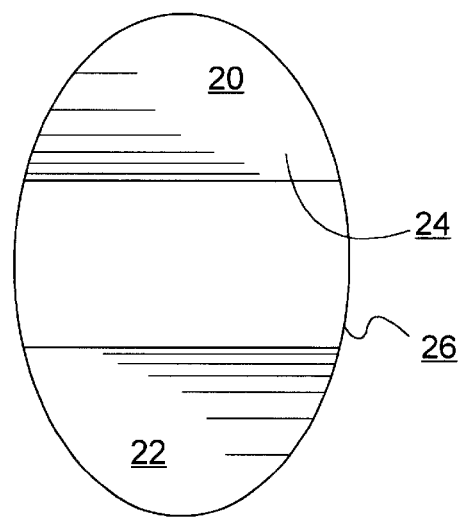
FIG. 4 is a front view of an oval shaped hull.

FIG. 4 is a front view of a hull having an oval-shaped exterior surface 26. In addition, the interior surface 24 is curved, and not made up of flat panels. The interior surface 24 is, therefore, saddle-shaped. The benefit of having an oval-shaped hull like in FIG. 4 is that there is less wetted surface area that would cause friction in the water. The benefit of having a curved interior surface 24 is that the flow of water through the hull would not be abruptly changed, which causes turbulence and reduces the efficiency of the hull. The hull of FIG. 4 is therefore more fuel efficient than the hull shown in FIGS. 2 and 3. However, the construction costs of the hull of FIG. 4 would be greater than that of the hull shown in FIGS. 2 and 3 because of the difficulty in making curved surfaces.

FIGS. 5 and 6 show the front view and cut away side view of a submarine hull according to the present invention. For submarine hulls, the preferred exterior surface 26 is circular. The spaces formed between the interior surface 24 and exterior surface 26 are different, and the higher space 28 would have to be more buoyant than the other parts of the hull. Comparing the interior surfaces 24 of the hull of FIG. 4 and the hull of FIG. 5, it is important to note to that the shape of the converging-diverging diffuser can be the same around the circumference of the interior surface 24, or it can have an upper part, and the lower part for separating ballast 22 and cargo 20. For liquid cargoes, the separating lines will be less distinct. Both types of hulls are part of the present invention.

FIGS. 7 and 8 show an alternative, asymmetric hull design for either a submarine or a surface vessel. These views make it clear that the spaces between the interior and the exterior surfaces can be biased to one side, e.g. the upper side, of the hull. This may increase stability, decrease construction costs, and have other benefits. However, the waveless qualities of the hull are nearly the same as the hull shown in FIGS. 5 and 6.

Figure 9:
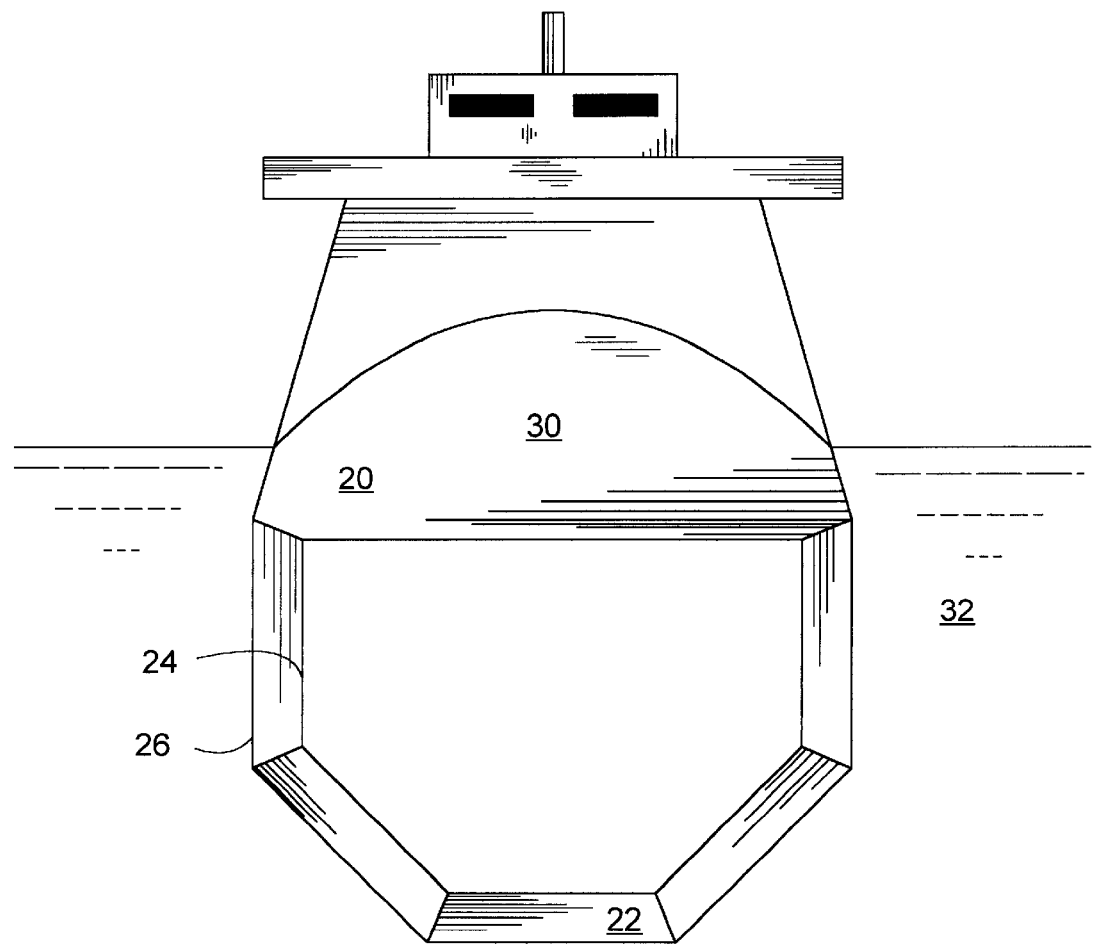
FIG. 9 is a front view of a ship having a hull according to the present invention.

FIG. 9 is a front view of a ship having a hull according to the present invention. Several important features can be seen in this view. For example, the vessel sits in the water 32, and has a ballast portion 22 near the bottom and a standard cargo area 20. This hull is modified octagonal shape. From bow to stern, the panels of the interior surface 24 could be flat, like the example shown in FIG. 3, or they can be curved and saddle shaped like the hull shown in FIG. 4. These are engineering choices left to the naval architect. In addition, notice a portion of the hull 30 that is raised above the waterline. This portion of the hull forms a bow that protects the vessel against water that crests up in front of the hull before it is drawn into the throat of the hull when the vessel is in motion.

FIG. 10 is a cutaway plan view of a hull according to the prior art. It is characterized by a port side 40a and a starboard side 42a that are symmetrical about the centerline 44a. The port side 40a and the starboard side 42a form a unitary, cigar-shaped hull structure. To make a hull according to the present invention that would nominally have the same operating characteristics, one could split the hull down the center line 44a, move the starboard side 42a to port, move the port side 40a to starboard, and secure them at a distance to obtain a hull as shown in FIG. 11.

FIG. 12 illustrates the wave making properties of a hull according to the prior art. The arrow 48 indicates the direction of all travel. It is shown that the hull makes three distinct waves as it travels forward through the water. First, the bow produces divergent bow waves 46. This is a pressure wave. The stern makes divergent stern waves 52, which is made by suction. Associated with the stern waves are transverse waves 50, made by water filling in the volume displaced by the vessel hull. To summarize, a vessel moving forward 48 must expend energy to make and overcome its bow wave 46, overcome the suction of the stern wave 52, and expend energy on the formation of transverse waves 50.

Figure 13:
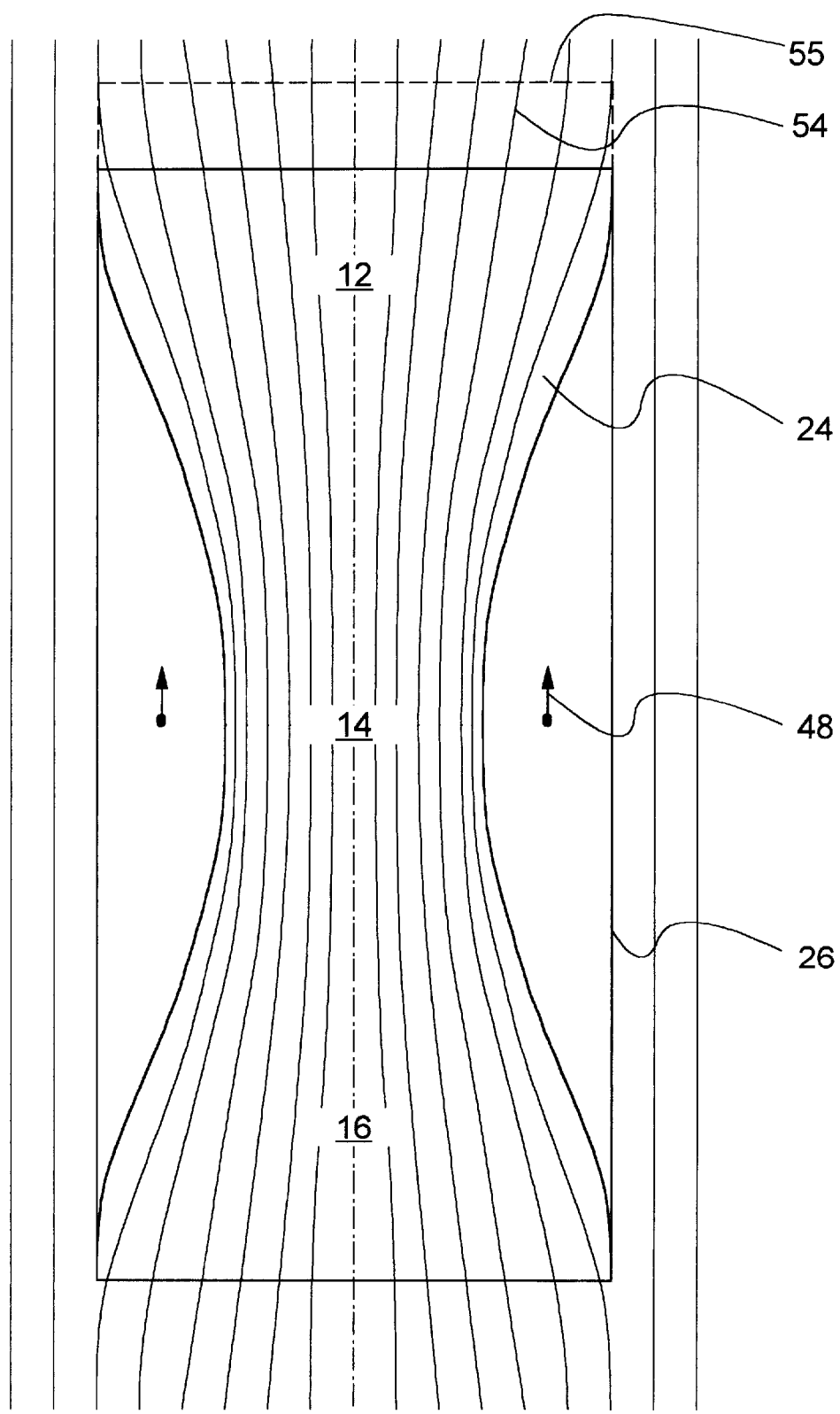
FIG. 13 is a cutaway plan view of a hull according to the present invention illustrating the flow of water through the hull.

FIG. 13 shows how the hull of the present invention avoids making waves. Flow lines 54 show the direction of travel of water inside and outside the hull. The exterior surface 26 is parallel to the direction of travel, and therefore does not displace water to the outside, which would make waves. Instead, water is directed along the interior surface to the bow throat opening 12. The lines of flow are compressed to a maximum at the middle throat 14, and expand to a flow nearly parallel to that of the outside water as it leaves the stern throat opening 16. The water as it is traveling through the throat 14 of the hull travels faster, and must have a lower static pressure than at the openings 12 and 16, according to the laws of conservation of energy for non-compressible fluids. The use of the converging-diverging diffuser substantially reduces turbulence, and does not make waves exterior to the vessel. This reduces energy consumption of the vessel for the formation of waves. The flow conditions at the bow throat 12 and the stern throat 16 are about the same. Therefore, no major waves propagate to the surroundings. At high speeds, the exterior hull may have to protrude forward of the interior surface as shown by the dotted lines 55.

There is, however, a penalty for the containment of the waves. There is an increased wetted surface area as compared to a conventional hull. Therefore, there are higher friction losses due to the increased surface area. In addition, there are higher friction losses in the diffuser section due to the increased velocity of the water through the hull. Altogether, the friction losses can be a few times higher than the losses for a conventional hull. These losses increase with the square of the hull velocity. Since the losses for wave making by a conventional hull rise with the 3rd, 4th, 5th, 6th, or higher power of the velocity, then trading them for the friction of the hull of the present invention will always be advantageous at higher speeds. The necessary and unexpected conclusion is that the hull of the present invention can achieve much higher speed than a conventional hull.

Instead of being completely waveless, it is more technically correct to say that the hull of the present invention creates a standing, half-wave starting at the bow throat opening 12, and cresting at the middle throat 14. It is a half wave because it does not have a corresponding pressure part of the wave. There are no bow, stern, or transverse waves. The only waves expected to be generated by the hull motion are small waves due to the boundary layer on the exterior hull surface 26, and the water velocity mismatch between the diffuser exit and the surrounding water due to the propulsion of the hull, excluding sail propulsion. The mismatch will inherently increase with the hull's speed and may require optimizing the propulsion/stern interface to minimize the hull's wake.

Figure 14:
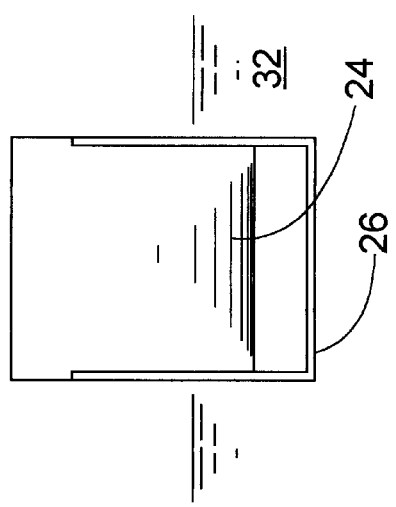
FIG. 14 is a front view of a hull according to the present invention that has been tested.

FIG. 14 is a front view of a practical vessel hull according to the present invention. One can see the flow channel below the water 32 defined by the space between the interior surface 24 and the exterior surface 26. Such a hull was tested using jet propulsion shown schematically in FIG. 1. A small bow crest was contained within the inlet throat 12 without disturbing the surrounding water 32.

Figure 15:
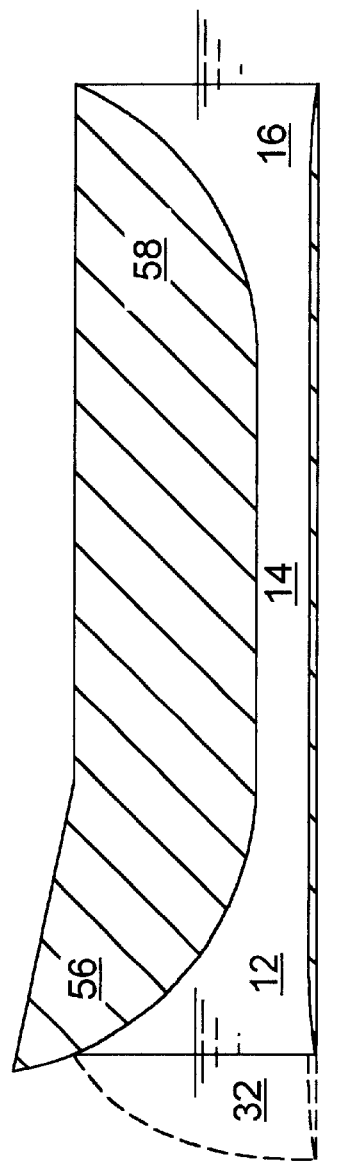
FIG. 15 is a cutaway side view of the hull shown in FIG. 14.

FIG. 15 is a side, cut away view of the hull shown in FIG. 14. In most respects, the hull is very similar to a hull according to the prior art, except for the additional structure of the exterior surfaces 26 that define a flow path. The bow of the hull 56 is slightly elevated compared to the stern 58 for much the same reason as a conventional hull. A waveless bow must contain the entire crest generated by the bow 56. At high speeds, the exterior hull 26 may have to protrude forward of the interior surface 24 as shown by the dotted lines in FIG. 15. In a submarine, the extended inlet that contains the pressure "crest" will be a cylinder as shown in the dotted lines in FIG. 13.

One must realize that a propulsion device speeds up a significant portion of the water flowing through the converging-diverging diffuser. This produces a suction effect at the diffuser inlet, thus reducing the size of the crest for surface vessels as well as the pressure "crest" for submarines as compared to conventional hulls. For waveless hulls, these crests cannot "spill over" the exterior hull 26.

The hull of the present invention may have many advantages over a conventional hull where the wave resistance can be many times more than the friction resistance of the vessel. Based on a book titled "Sailing Theory and Practice", by C. A. Marchaj, published by Dodd, Mead & Co, New York 1964, wave-making begins to have an effect when the value of Vs/√L reaches about 0.7. In this equation, Vs=speed of the boat, L=length of the water line. For the values Vs/√L=1.1 and higher, the resistance increases rapidly and can rise to the 3rd, 4th, 5th, or even 6th power of the boat speed while the friction resistance rises with the second power of speed.

According to the book mentioned above, a model was tested at the Stevens Institute of Technology for a sailboat having the following dimensions: length overall=45.5 feet, water line length=32.26 feet, beam=10.58 feet, draft=6.56 feet, and displacement=11.38 tons (25,500 pounds). The friction resistance of hull equals the wave making resistance at 6.3 knots, each being 110 pounds. However, at 8.4 knots, the wave making resistance is 816 pounds., which is 4.46 times larger than the frictional resistance, 183 pounds. Above about 8.4 knots, the wave making resistance rises even more rapidly. This limits the finest, heavy-displacement keelboats to speed/length ratio of about Vs/√L=1.4. The America's Cup sailing vessels exceed 1.45. Destroyers exceed 2.0. With the length of destroyers ranging from 320 feet to 450 feet, they must be moving at about 40 knots. This indicates an enormous opportunity for saving the energy used in wave making.

Another advantage of the novel hull is its stability due to a large mass of water in the converging-diverging diffuser inside the hull. During maneuvering, however, that water must turn together with the hull, which may require rudders not only in the stern but also in the bow. The diffuser walls, both at the bow 12 and stern 16, may accommodate the rudders as parts of the walls, so that the rudders will not protrude into the flow path when the hull is moving straight. Such rudders will have an advantage over the protruding rudders applied in the prior art that may account for as much as 15% of the total drag losses.

Figures 16, 17:
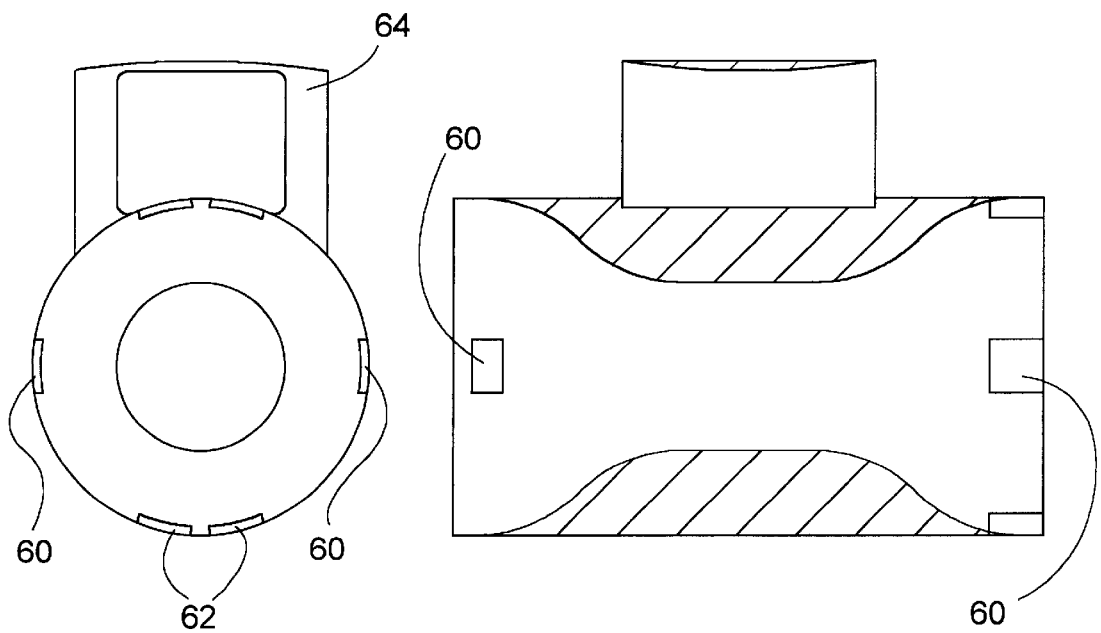
FIG. 16 is a front view of a submarine.
FIG. 17 is a cutaway side view of the submarine shown in FIG. 16.
Figure 18:
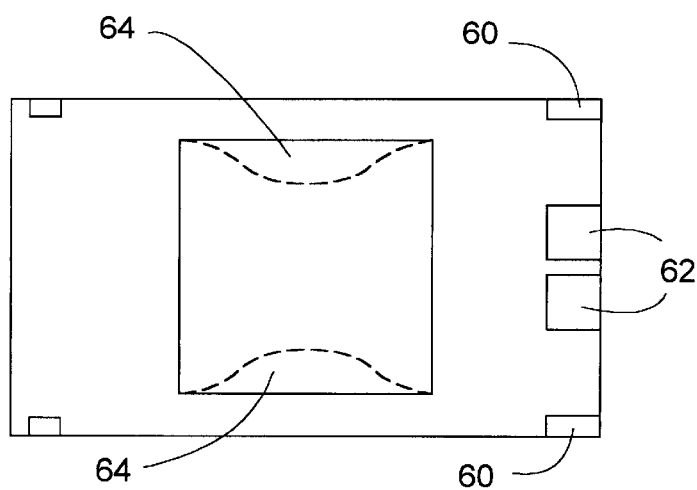
FIG. 18 is a top view of the submarine shown in FIG. 16.

The water turning with the vessel during maneuvering may also rotate inside the diffuser due to the Coriolis effect. To prevent hull rotation by friction forces between the rotating water and the hull, stabilizing rudders will be needed. The same rudders may also be used to counteract rolling of the hull due to waves. FIGS. 16, 17 and 18 depict schematically the steering rudders 60 and stabilizing rudders 62 in a submarine, where the sail 64 is a double and waveless as well. Stabilizing rudders 62 should be provided in pairs.

In conclusion, the hull of the present invention has many different potential applications. A partial list is as follows: torpedo, submarine, destroyer, carrier, patrol boat, pilot boat, rescue boat, tug boat, air-driven lake boat, tanker, freighter, ocean liner, barge, ferry, motorboat, ski boat with an adjustable diffuser at speed, sailboat, and even an airship/blimp.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A hull for vessels comprising an exterior surface, an interior surface under the hull's waterline and propulsion means, wherein
    said exterior surface has a substantially constant cross section along the length of the hull,
    said interior surface substantially encloses a flow channel for the length of the hull, the interior surface further comprising a converging-diverging diffuser, and
    said propulsion means is at least one of a water-jet drive, sail, air injection into the flow channel at the diverging portion of the diffuser, and electromagnetic thruster.

2. The hull of claim 1, wherein said exterior surface has a cross section of a regular geometric shape.

3. The hull of claim 2, wherein said geometric shape is one taken from the group consisting of a rectangle, hexagon, octagon, and decagon.

4. The hull of claim 3, wherein said diffuser is formed by converging and diverging surfaces on opposite sides of said geometric shape.

5. The hull of claim 4, wherein one of said opposite sides is a side of said geometric shape that is nearest the waterline, and the opposite side is near of the deepest part of the hull when the vessel is in water.

6. The hull of claim 2, wherein said geometric shape is a circle or an oval.

7. The hull of claim 6, wherein said diffuser is formed by opposing converging and diverging surfaces within the flow channel.

8. The hull of claim 7, wherein one of said opposing surfaces is nearest the waterline, and the other opposing surface is near the deepest part of the hull when the vessel is in water.

9. The hull of claim 5, wherein the converging-diverging surface that is nearest the waterline is adapted to hold a vessel's cargo.

10. The hull of claim 5, wherein the converging-diverging surface that is near the deepest part of the hull is adapted to hold a vessel's ballast.

11. The bull of claim 1, wherein a portion of the flow is drawn from the flow channel and is readmitted to the diverging portion of the diffuser.

12. The hull of claim 1, said propulsion means comprising a means to inject air into the flow channel at the diverging portion of the diffuser.

13. The hull of claim 1, said water-jet drive comprising a water inlet in the converging portion of the diffuser, a pump, and a water outlet in the diverging portion of the diffuser.

14. A submarine hull comprising
an exterior surface and
an interior surface, wherein said exterior surface has a substantially constant cross section along the length of the hull, and said interior surface substantially encloses a flow channel for the length of the hull, said interior surface further comprising a converging-diverging diffuser, and a substantially waveless sail, wherein said sail has an exterior surface that has a substantially constant cross section along the length of the sail, and an interior surface enclosing a flow channel for the length of the sail, said interior surface comprising a converging-diverging diffuser.

15. The hull of claim 14 further comprising at least one steering rudder.

16. The hull of claim 14 further comprising at least one pair of stabilizing rudders.

17. A submarine hull comprising an exterior surface and an interior surface, wherein said exterior surface has a substantially constant cross section along the length of the hull, and said interior sure substantially encloses a flow channel for the length of the hull, said interior surface further comprising a converging-diverging diffuser and a propulsion means comprising a water inlet in the converging portion of the diffuser, a pump, and a water outlet in the diverging portion of the diffuser.

18. A hull for vessels comprising an exterior surface and an interior surface under the hull's waterline and a non-propeller propulsion means, wherein said exterior surface has a substantially constant cross section along the length of the hull, and said interior surface substantially encloses a flow channel for the length of the hull, the interior surface further comprising a converging-diverging diffuser.

* * * * *